United States Patent
Yonge, III et al.

(10) Patent No.: US 6,397,368 B1
(45) Date of Patent: May 28, 2002

(54) FORWARD ERROR CORRECTION WITH CHANNEL ADAPTATION

(75) Inventors: Lawrence W. Yonge, III, Ocala; Bart W. Blanchard, Ft. McCoy; Harper Brent Mashburn, Gainesville; Timothy Robert Gargrave, Ocala; William Edward Lawton, Gainesville, all of FL (US)

(73) Assignee: Intellon Corporation, Ocala, FL (US)

( * ) Notice: Subject to any disclaimer, the term of this patent is extended or adjusted under 35 U.S.C. 154(b) by 0 days.

(21) Appl. No.: 09/455,186

(22) Filed: Dec. 6, 1999

(51) Int. Cl.[7] .................... H03M 13/03; H03M 13/00
(52) U.S. Cl. ............................... 714/792; 714/784
(58) Field of Search ........................... 714/792, 784; 370/203, 206, 208, 432

(56) References Cited

U.S. PATENT DOCUMENTS

| | | | |
|---|---|---|---|
| 4,881,241 A | 11/1989 | Pommier et al. ............. 375/38 |
| 5,197,061 A | 3/1993 | Halbert-Lassalle et al. ... 370/11 |
| 5,228,025 A | * 7/1993 | Le Floch et al. ............ 370/206 |
| 5,452,288 A | * 9/1995 | Rahuel et al. ............... 370/203 |
| 5,528,581 A | 6/1996 | De Bot ......................... 370/19 |
| 5,610,908 A | 3/1997 | Shelswell et al. ........... 370/210 |
| 5,694,389 A | * 12/1997 | Seki et al. ................... 370/208 |
| 5,757,766 A | 5/1998 | Sugita ......................... 370/206 |
| 5,799,033 A | 8/1998 | Baggen ....................... 375/200 |
| 5,862,189 A | 1/1999 | Huisken et al. ............. 375/341 |
| 5,903,614 A | * 5/1999 | Suzuki et al. ............... 375/340 |
| 5,914,932 A | * 6/1999 | Suzuki et al. ............... 370/203 |
| 5,963,557 A | * 10/1999 | Eng ............................. 370/432 |
| 5,966,412 A | * 10/1999 | Ramaswamy ............... 375/341 |
| 6,005,605 A | * 12/1999 | Kostreski et al. ............. 348/21 |
| 6,108,353 A | * 8/2000 | Nakamura et al. .......... 370/504 |
| 6,125,150 A | 9/2000 | Wesel et al. ................ 375/265 |
| 6,151,296 A | * 11/2000 | Vijayan et al. ............. 370/208 |
| 6,158,041 A | * 12/2000 | Raleigh et al. ............. 714/792 |
| 6,166,667 A | * 12/2000 | Park ............................. 341/94 |

* cited by examiner

Primary Examiner—Albert DeCady
Assistant Examiner—Joseph D. Torres
(74) Attorney, Agent, or Firm—Fish & Richardson P.C.

(57) ABSTRACT

A scheme for configuring an FEC encoder (including an associated interleaver) for changing data channel characteristics. Channel information specifying a modulation mode and carriers capable of supporting the modulation mode for the data channel is received by a transmitting network node for use in a data transmission to a receiving network node. The received channel information is based on a prior data transmission to the receiving network node over the data channel. Configuration values are computed from the received channel information and an amount of data to be transmitted in a data transmission. The FEC encoder is configured to operate on the data transmission data amount according to the configuration information.

14 Claims, 15 Drawing Sheets x = expected differential phase location

US 6,397,368 B1

FORWARD ERROR CORRECTION WITH CHANNEL ADAPTATION

BACKGROUND OF THE INVENTION

The invention relates to OFDM data transmission systems.

OFDM is a spread spectrum technology wherein the available transmission channel bandwidth is subdivided into a number of discrete channels or carriers that are overlapping and orthogonal to each other. Data are transmitted in the form of symbols that have a predetermined duration and encompass some number of carrier frequencies. The data transmitted over these OFDM symbol carriers may be encoded and modulated in amplitude and/or phase, using conventional schemes such as Binary Phase Shift Key (BPSK) or Quadrature Phase Shift Key (QPSK).

A well known problem in the art of OFDM data transmission systems is that of impulse noise, which can produce bursts of error on transmission channels, and delay spread, which often causes frequency selective fading. To address these problems, prior systems have utilized forward error correction (FEC) coding in conjunction with interleaving techniques. FEC coding adds parity data that enables one or more errors in a code word to be detected and corrected. Interleaving reorders the code word bits in a block of code word data prior to transmission to achieve time and frequency diversity.

Although the prior interleaving techniques can minimize some of the effects of impulse noise and delay spread on OFDM data transmission, they cannot mitigate the impact of a combination of impulse noise and frequency nulls, which may result in lengthy noise events.

SUMMARY OF THE INVENTION

The present invention features a mechanism for adapting a forward error correction encoder (including an associated interleaver) to a channel.

In one aspect of the invention, a forward error correction (FEC) encoder is adapted to a channel over which data encoded by the FEC encoder and modulated onto OFDM symbols is to be transmitted in a data transmission to a receiving network node. Channel information specifying OFDM symbol block sizes associated with the data transmission are received. The channel information is based on a prior data transmission to the receiving network node. FEC encoder configuration values are computed based on the received channel information. The FEC encoder is then configured to operate on the data according to the configuration information.

Embodiments of the invention may include one or more of the following features.

The received channel information can be based on characteristics of the channel. It can include a modulation type and carriers capable of supporting the modulation type for the channel.

The OFDM symbol block sizes may include a fixed size and a variable size. The FEC encoder configuration values may be computed by determining from the channel information a number of OFDM symbol blocks of the fixed size and a number of remaining data bytes to be included in a last OFDM symbol block of the variable size, and computing a number of symbols for transmitting the remaining data bytes from the number of remaining data bytes, the channel information and a code block size associated with the FEC encoder.

The FEC encoder can include an interleaver configured to store the last variable size OFDM symbol block of encoded data based on the computed number of symbols and the channel information.

The FEC encoder can include a Reed-Solomon encoder. A maximum number of Reed-Solomon bytes in the last variable size OFDM symbol block can be computed. A Reed-Solomon block size can be computed from the maximum number of Reed-Solomon bytes in the last variable size block.

Among the advantages of the present invention are the following. In network having a transmitting network node communicating with a receiving network node over a data channel, and each of the nodes having a transmit portion and receive portion, the transmit portion in the transmitting network node can take advantage of information regarding recent channel conditions as reflected in the most up-to-date channel map for the channel produced by the receive portion of the receiving network node based on a prior data transmission to the receiving network node. The FEC encoder configuration may be adjusted as necessary to accommodate variable OFDM symbol block sizes dictated by the channel map updates.

Other features and advantages of the invention will be apparent from the following detailed description and from the claims.

DETAILED DESCRIPTION

Figure 1:
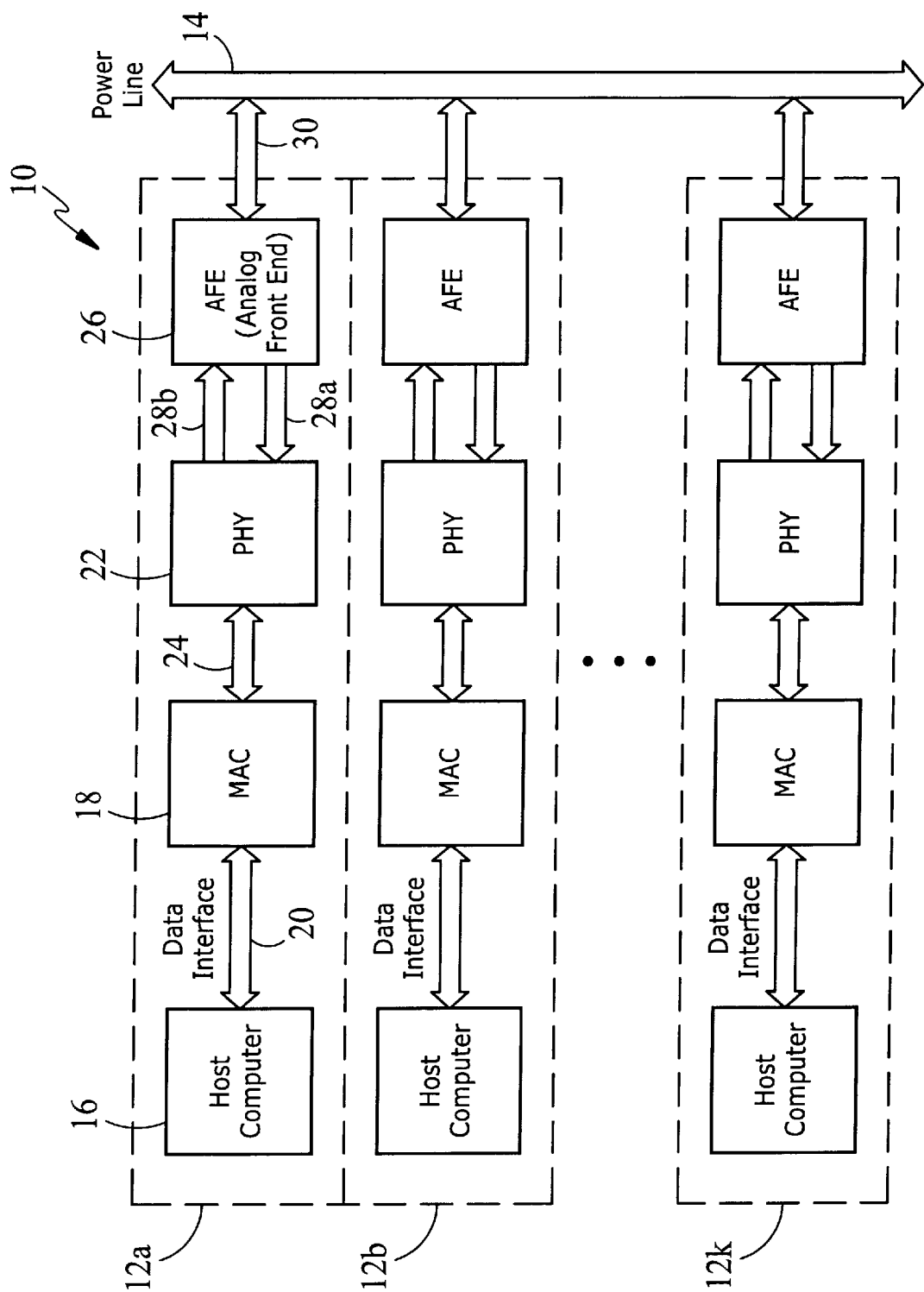
FIG. 1 is a data network of network nodes coupled to a power line transmission channel, each of the nodes in the data network including an end station (shown as a host computer), a media access control unit, a physical layer device and a analog front end unit.

Referring to FIG. 1, a network 10 includes network nodes 12a, 12b, . . . 12k coupled to a data transmission medium shown as a power line (PL) 14. During a communication between at least two of the network nodes 12 over the data transmission medium, a first network node (for example, 12a) serves as a transmitting network node and at least one second network node (for example, 12b) serves as a receiving network node. Each network node 12 includes an end station or device 16, e.g., a host computer (as shown), cable modem, etc.. The network node 12 further includes a media access control (MAC) unit 18 connected to the end station 16 by a data interface 20, a physical layer (PHY) unit 22 connected to the MAC unit 18 by a MAC-to-PHY I/O bus 24 and an analog front-end (AFE) unit 26. The AFE unit 26 connects to the PHY unit 22 by separate AFE input lines 28a and output lines 28b, as well as connects to the power line 14 by an AFE-to-PL interface 30.

Generally, the MAC and PHY units conform to the Open System Interconnect (OSI) Model's data link layer and the physical layer, respectively. The MAC unit 18 performs data encapsulation/decapsulation, as well as media access management for transmit (Tx) and receive (Rx) functions. The PHY unit 22 performs transmit encoding and receive decoding, among other functions, as described more fully below. The AFE unit 26 provides for attachment to the transmission medium, i.e., the power line 14. The MAC and AFE units may be implemented in a conventional manner and therefore will be discussed no further herein.

Figure 2:
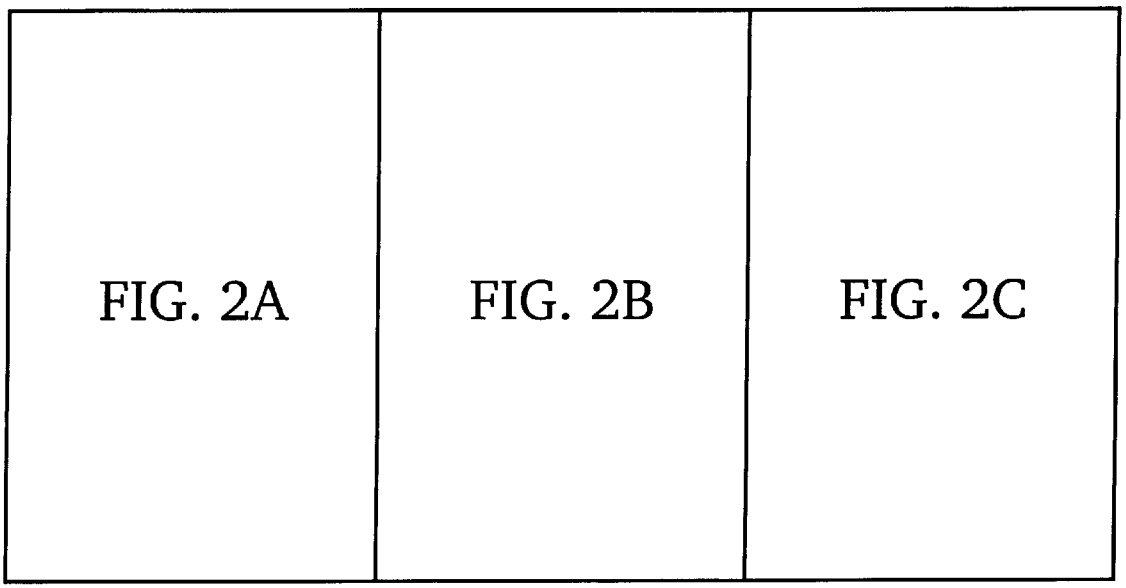
FIG. 2 is a detailed block diagram of the physical layer (PHY) unit (shown in FIG. 1) which includes, among other functional units, an FEC encoder (having as internal functional blocks an RS encoder, a convolutional encoder and an interleaver) on the transmit path, transmit (Tx)/receive (Rx) configuration units, a channel maps memory and a channel estimation unit which operate collectively to configure the PHY unit for channel adaptation.
Figure 2A:
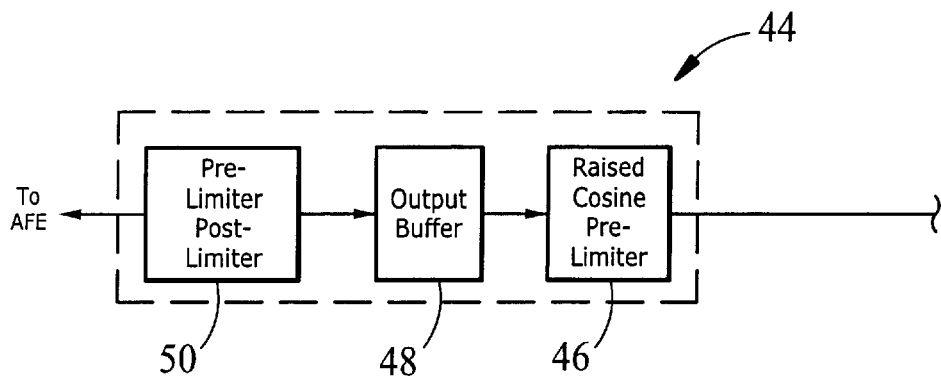
Figure 2A:
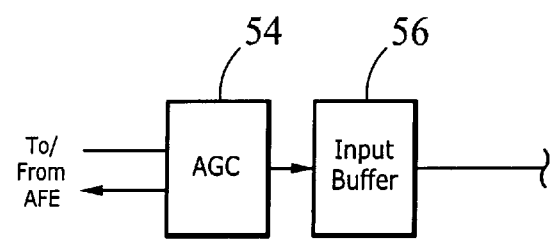
Figure 2B:
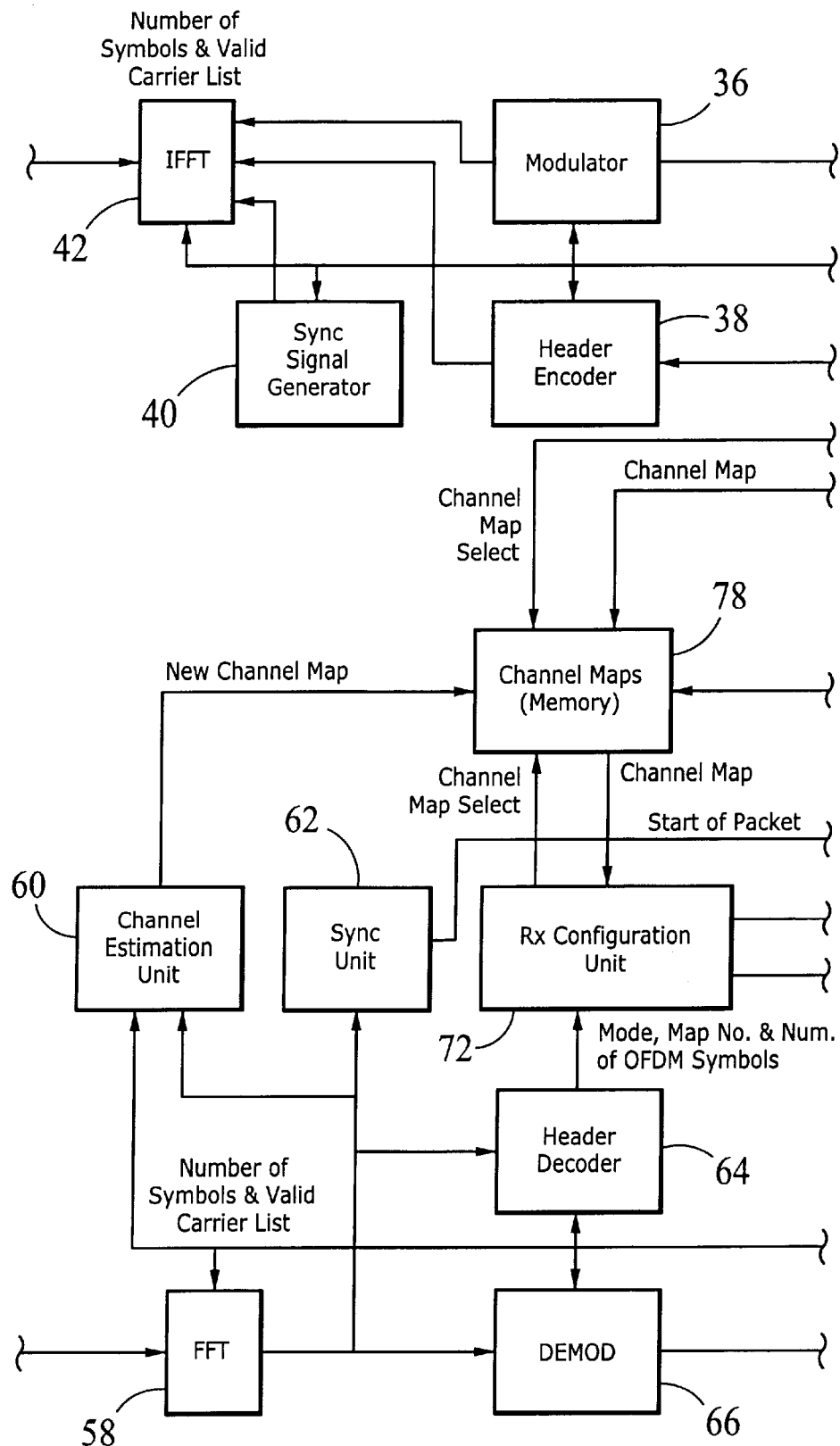
Figure 2C:
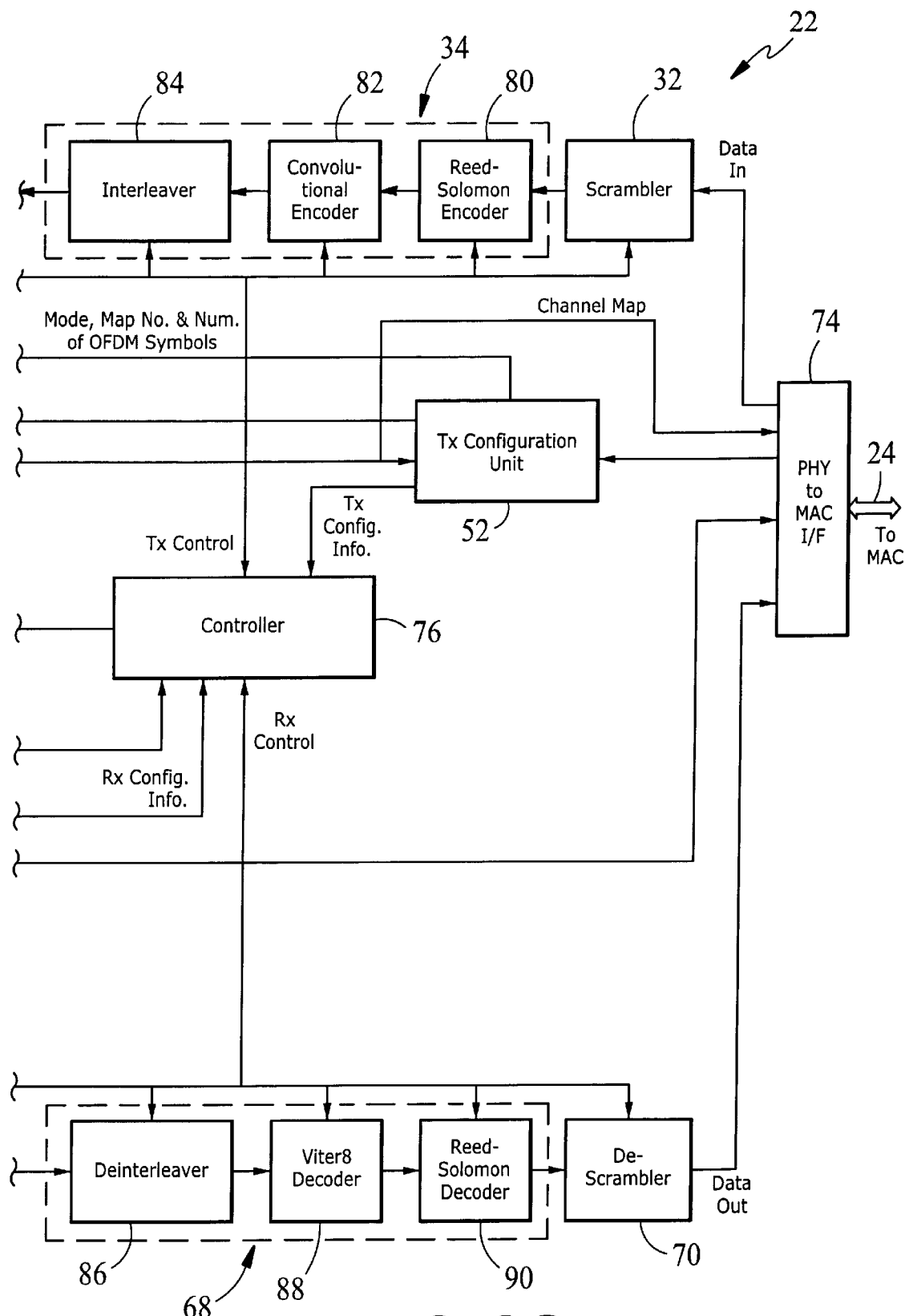

Referring to FIG. 2, the PHY unit 22 performs both Tx and Rx functions for a single node. To support Tx functions, the PHY unit 22 includes a scrambler 32, and FEC encoder 34, a modulator 36, a header encoder 38, a synchronization signal generator 40, an Inverse Fast Fourier Transform (IFFT) unit 42 and a post-IFFT block 44.

During a data transmit process, data is received at the PHY-to-MAC interface (MAC interface) 74 over the PHY-to-MAC bus 24. The MAC interface provides the data to the scrambler 32, which ensures that the data as presented to the input of the FEC encoder 34 is substantially random in pattern. The FEC encoder 34 encodes the scrambled data pattern in a forward error correction code and subsequently interleaves the encoder data. Any known forward error correction code, for example, a Reed-Solomon, or, as shown, both a Reed-Solomon code and a convolution code, can be used for this purpose. The FEC encoder 34 therefore includes a Reed-Solomon (RS) encoder 80, a convolutional encoder 82 and an associated block interleaver 84. Although the block interleaver is shown as part of the FEC encoder, it will be appreciated that the block interleaver 84 may be a separate component. The Reed-Solomon encoder 80 generates a code block from the scrambler output sequence using 256, 239 RS encoding. The convolutional encoder 82 receives as input the output from the RS encoder 80 and encodes that input with a standard rate equal to ½ and a constraint length of K=7. When the last bit of data has been received at the convolutional encoder 82, it inserts 6 tail bits to flush out its internal shift register. As known in the art, the convolutional encoder 82 is provided with a puncturing block for converting the convolutional encoder's output from a ½ coding rate to some other coding rate, e.g., ¾. The modulator 36 reads the FEC encoded data from the interleaver 84 and encoded header information from the header encoder 38, and modulates the encoded packet data onto carriers in OFDM symbols in accordance with conventional OFDM modulation techniques. Those modulation techniques may be coherent or differential. In the preferred embodiment, the modulation mode or type may be either Binary Phase Shift Keying with ½ rate coding ("½ BPSK"), Quadrature Phase Shift Keying with ½ rate coding ("½ QPSK") or QPSK with ¾ rate coding ("¾ QPSK"). The IFFT unit 42 receives input from the modulator 36, the header encoder 38 and synchronization signal generator 40, and provides processed packet data to the post IFFT block 44 described above, which further processes the packet data before transferring it to the AFE unit 26 (from FIG. 1). Operational and implementation-specific details of the IFFT and post-IFFT block functional units 42, 44, respectively, are well known and, as they are not pertinent to an understanding of the present invention, will not be discussed in any further detail.

The Tx configuration unit 52 receives information about the channel over which data is to be transmitted from the MAC interface 74 and uses this information to select an appropriate channel map from the channel maps memory 78. The selected channel map specifies a transmission mode, as well as a modulation type (including an associated coding rate) and set of carriers to be used for the data transmission, and therefore specifies OFDM symbol block sizes (both fixed and variable) associated with the data transmission. An OFDM symbol block includes a plurality of symbols and may correspond to a packet or a portion thereof. The information read from the channel map is referred to herein as channel information. The Tx configuration unit 52 computes Tx configuration information from the channel information (i.e., channel map data). The Tx configuration information includes transmission mode, modulation type (including an associated FEC coding rate, as indicated above), number of symbols, number of bits per symbol, as well as number and size of Reed-Solomon blocks. The Tx configuration unit 52 provides the Tx configuration information to the PHY controller 76, which uses the information to control the configuration of the FEC encoder 34. More specifically, the controller 76 controls the interleaver configuration according to the carriers, number of bits per symbol and modulation specified by the Tx configuration unit 52. The controller 76 also enables modification of the RS block size based on the RS specific information computed by the Tx configuration unit 52. In addition to configuration control signals, the controller 76 also provides other conventional control signals to the FEC encoder 34, as well as the scrambler 32, the modulator 36, the synchronization signal generator 40 and the IFFT unit 42. The Tx configuration unit 52 also provides to the header encoder 38 the following header information: transmission mode, channel map number and number of OFDM symbols (to be transmitted) in a data packet.

During a data receive process, packets transmitted over the channel to the receiving network node 12b by the transmitting network node 12a are received at the PHY unit 22 from the AFE unit 26 by the AGC unit 54. The output of the AGC unit 54 is stored in the input buffer 56 prior to being processed by the FFT unit 58. The output of the FFT unit 58 is provided to the channel estimation unit 60, the synchronization unit 62, the header decoder 64 and the demodulator 66. More specifically, phase and amplitude values of the processed packet data are provided to the channel estimation unit 60, which produces a new channel map for use by the tx configuration unit 52 in the transmitting network node 12a during the next data transmission by that transmitting network node, as will be described. The Rx configuration unit 72 receives the mode, the channel map number and the number of OFDM symbols from the header decoder 64, retrieves the channel map specified by the map number provided by the header decoder 64, and provides Rx configuration information to the controller 76. The synchronization unit 62 provides a start-of-packet signal to the controller 76. In response to these inputs, the controller 76 provides configuration and control signals to the FEC decoder's functional units, which include a de-interleaver 86, a Viterbi decoder 88 and an RS decoder 90, and to the demodulator 66. More specifically, the PHY controller 76 specifies the appropriate number of rows and columns for the de-interleaver 86, the number of bits to be received by the Viterbi decoder 88 and the number and size of the Reed-Solomon blocks for decoding by the Reed-Solomon decoder 90. Additionally, it conveys the modulation type associated with the received packet data to the demodulator 66.

The demodulator 66 demodulates the OFDM symbols in the processed packet data received from the FFT unit 58 and converts phase angles of the packet data in each carrier of each symbol to metric values. The demodulator 66 stores the metric values in a deinterleaver 86. The FEC decoder 68 reads the metric values from the deinterleaver 86 and uses the metric values for decoding purposes. The FEC decoder 68 corrects bit errors occurring during transmission from the FEC encoder 34 (of a transmitting node) to the FEC decoder 68 and forwards the decoded data to the de-scrambler 70, which performs an operation that is the reverse of that which was performed by the scrambler 32. The output of the de-scrambler 70 is then provided to the MAC interface 74 for transfer to the MAC unit 18 (and, ultimately, to an application of the host computer 16).

For purposes of simplification and clarity, details of the PHY unit's transmitter/receiver functional units which are known to those skilled in the art and not considered pertinent to the understanding of the invention have been largely omitted herein.

Figure 3A:
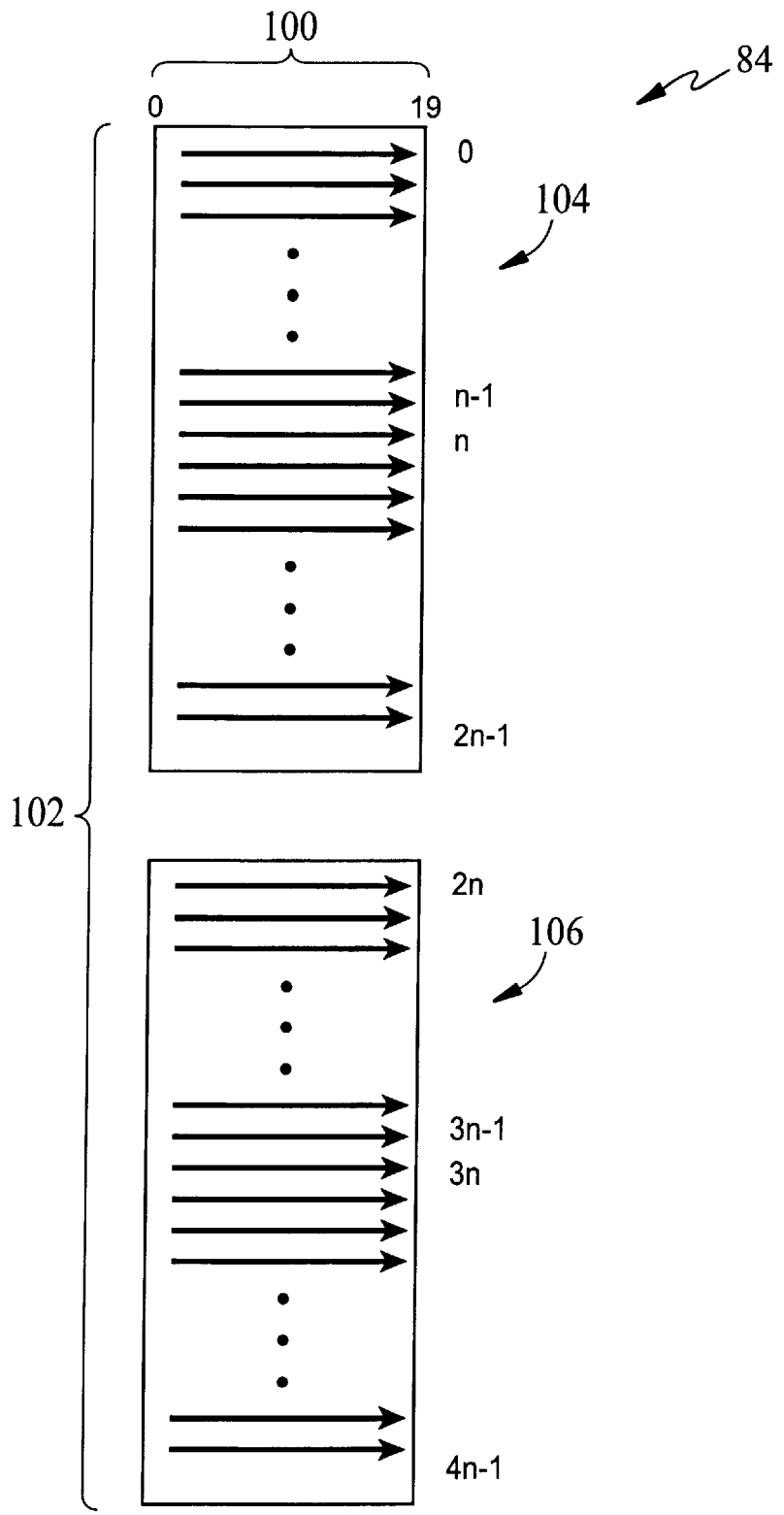
FIG. 3A is an illustration of the interleaver of FIG. 2 as written with encoded data by the convolutional encoder (also of FIG. 2).
Figure 3B:
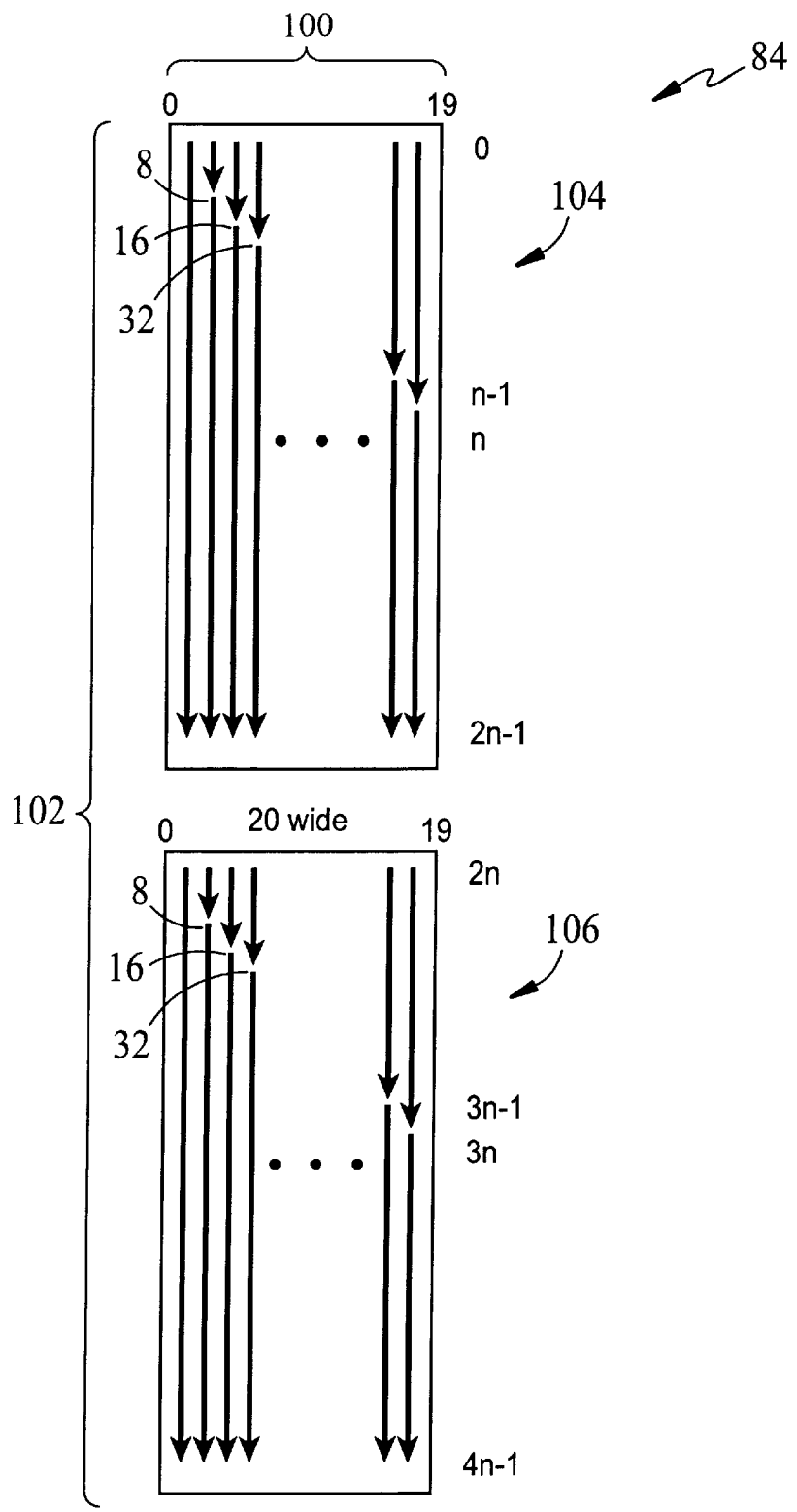
FIG. 3B is an illustration of the interleaver as read by the modulator shown in FIG. 2.

Referring to FIGS. 3A and 3B, the interleaver 84 (as depicted during a write operation) is a row/column block interleaver memory of a fixed number M or columns 100 and a variable number R or rows 102. In the preferred embodiment, M=20 and R is a value in the range of 28 to 2*N, where N is equal to 84, the maximum number of usable carriers per symbol. The interleaver 84 stores an OFDM symbol block (or, simply, block) to be transmitted during a packet transmission. Each packet includes one or more blocks. In the described embodiment, each block includes a maximum of 40 OFDM symbols. The interleaver 84 is implemented in a first 168×20 bit RAM 104 and a second 168×20 bit RAM 106. As illustrated by the arrows in FIG. 3A, data is stored by row, beginning with row 0. In the illustrated embodiment, the interleaver 84 is capable of being operated in two different modes: a first ("standard") transmission mode and a second ("robust") transmission mode.

In the standard transmission mode, the interleaver 84 stores 40 OFDM symbol blocks associated with a packet, and is written in the following manner. For BPSK modulation type, only one of the two RAMs 104, 106 is used. The number of used rows is equal to two times the number of usable carriers per OFDM symbol. Twenty bits of encoded data are written into consecutive rows starting at row 0, as shown by the arrows. The least significant bit (LSB) of the twenty bit word is first-in-time encoded data. For QPSK modulation, both of the RAMs 104, 106 are used. After the first RAM 104 is filled from row 0 to row N (where N=(2*number of usable carriers)−1), the second RAM 106 is filled starting at row 0.

The interleaver 84 is depicted during a read operation of a standard transmission in FIG. 3B. Referring to FIG. 3B, during a read operation for both BPSK and QPSK modulation types (or modes), the interleaver 84 is read by column with some amount of shifting to reorder bits. The modulator 36 reads by column starting at row 0, with each successive column read starting with the offset p=8 by adding eight to the previous column's start row. The row numbers (addresses) J are computed according to $$J=(1+[(K-1)*p]) \mod N \qquad (1)$$

where K is the column number, p is an offset parameter (indicating the amount by which the column bits are shifted) and N is the total number of rows (or selectable memory locations). As an example, and as shown in the figure, if K=2, p=8, and N=84, the column read for the second column will begin at the ninth row (corresponding to carrier N=8). The LSB of the 20-bit word will be first-in-time modulated data. While the BPSK mode data is read from the first RAM 104 only, the QPSK mode data is read from both RAMS 104, 106 simultaneously. For each carrier, one bit is read from each RAM using the same address to address both RAMs.

For the standard transmission mode (and both modulation modes), the number of usable carriers for the standard packet is determined from the channel map. The above technique provides data spreading in both time and frequency, allowing block errors in either domain to be spread far enough apart to allow correction by the FEC decoder 68.

The robust transmission mode interleaver varies from the standard packet interleaver in several ways. Its uses only the first 10 columns of the first RAM 104 and N rows (i.e., the number of usable carriers) to generate 10 OFDM symbols. As described in detail in co-pending U.S. application Ser. No. 09/377,131, in the name of Lawrence W. Yonge III, et al., incorporated herein by reference, the modulator 36 reads the interleaver 84 four consecutive times to create a 40 symbol packet containing four copies of the data. Alternatively, the robust transmission mode could be implemented to use some other number of columns, for example, 5 columns (for a 20 symbol block). Thus, the robust transmission mode interleaving process ensures that the data bit copies are not modulated onto adjacent carriers on a given symbol or neighboring symbols. Rather, they are spread uniformly in time and frequency so as to ensure successful decoding. While the redundant data need not be spread uniformly, it will be understood that the greater and more even the data copy spacing, the more robust the transmission is likely to be. In the illustrated embodiment, only the BPSK ½ rate coding modulation mode is used with robust transmission mode.

As it may be necessary or desirable to disable certain usable carriers, for example, it may be necessary to disable one or more of the 84 carriers so that the transmission does not interfere with the frequency bands of other RF services, the interleaver shift mechanism is adjustable for different numbers of usable carriers. If the number of usable carriers is 83, for instance, the ¼ offset requires a 20 row shift instead of the 21 row shift used for all 84 carriers and the shift mechanism will be adjusted accordingly.

Preferably, because the robust transmission mode has an additional level of data redundancy and therefore can only transmit a fraction of the amount of data that may be sent using the standard transmission mode, it has a lower data rate than the standard transmission mode. Consequently, its use may be limited to certain communications environments that require a high degree of reliability. For example, the robust mode may be particularly well-suited for use in broadcast transmission modes, in which the transmitting network node cannot adapt to each and every receiving network node because each of those nodes has a different channel and those channels may have frequency nulls in different parts of the frequency band. Another use would be to establish initial contact between nodes which communicate over a power line. During such an initial set-up, a transmitting network node does not know which channel connects it to the receiving network node and thus will transmit in a mode that the receiving network node can hear. However, the transmitting network node may not want to always transmit in the robust mode, as the robust mode may use too high a percentage of the channel. Thus, the transmitting network node's goal is to migrate to the highest data rate as soon as possible so that other network nodes can use the channel. The transmitting network node won't know what that data rate is until it has established initial communications with the receiver.

The interleaver control circuitry for controlling the mechanics of the reads and writes is well-known and therefore omitted from the description. Such control circuitry may be included in the convolutional encoder 82 and modulator 36, as is assumed in the illustrated embodiment, in the interleaver 84 itself, or may reside in a separate control unit.

As indicated above, the FEC encoder 34 and the modulator 36 are controlled by the controller 76 to operate according to a selected combination of modulation mode type (including coding rate) and transmission mode (standard BPSK or QPSK, or BPSK robust mode), and selected set of usable carriers. The controller 76 provides such control in response to input from the Tx configuration unit 52, which reads an appropriate channel map from the channel map memory 78. As indicated above, the channel map defines for the channel each data transmission the mode type (robust mode, or standard modes BPSK or QPSK, as well as the coding rates for BPSK/QPSK) and those of the available carriers to be modulated with data (i.e., the usable carriers). Thus, it will be recognized that the number of blocks in a given packet transmission and the size of the last block in the packet sequence is determined by channel map, which may be frequently updated for changing channel conditions, as described below.

Figure 4:
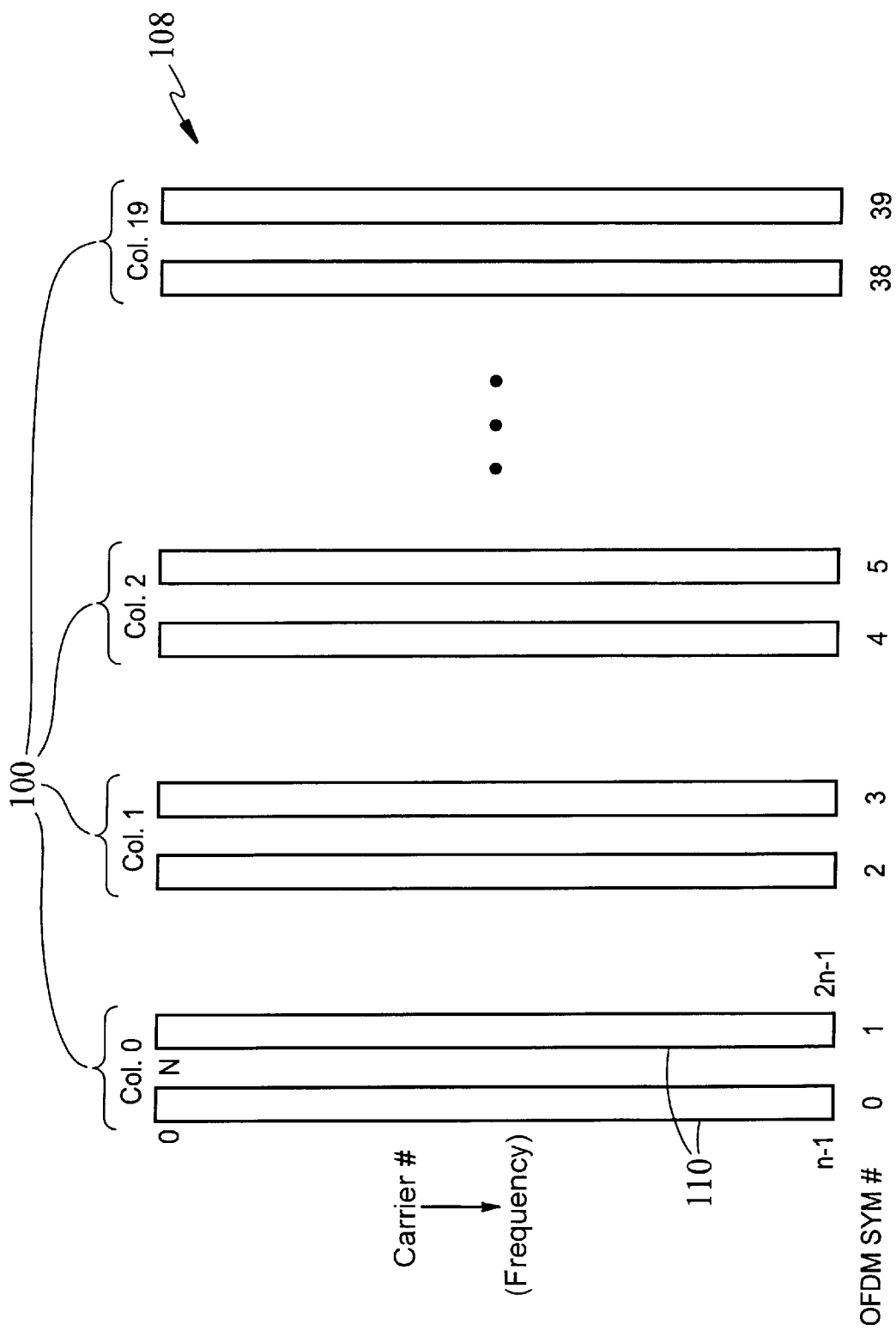
FIG. 4 is an illustration of the arrangement of OFDM symbols stored in a single RAM of the interleaver for BPSK and QPSK modulations.

Referring to FIG. 4, an arrangement of OFDM symbols within a single one of the RAMs 104, 106 of the interleaver 84 as it is used for standard transmission mode 108 is shown. Each of the twenty columns 100 stores two OFDM symbols 110 (for a total of 40 OFDM symbols per block), with rows 0 to N−1 corresponding to the first symbol and rows N to 2N−1 corresponding to the second symbol. Thus, Column 0 corresponds to symbols 0 and 1, Column 1 corresponds to symbols 2 and 3, Column 2 corresponds to symbols 4 and 5, and so forth.

Figure 5:
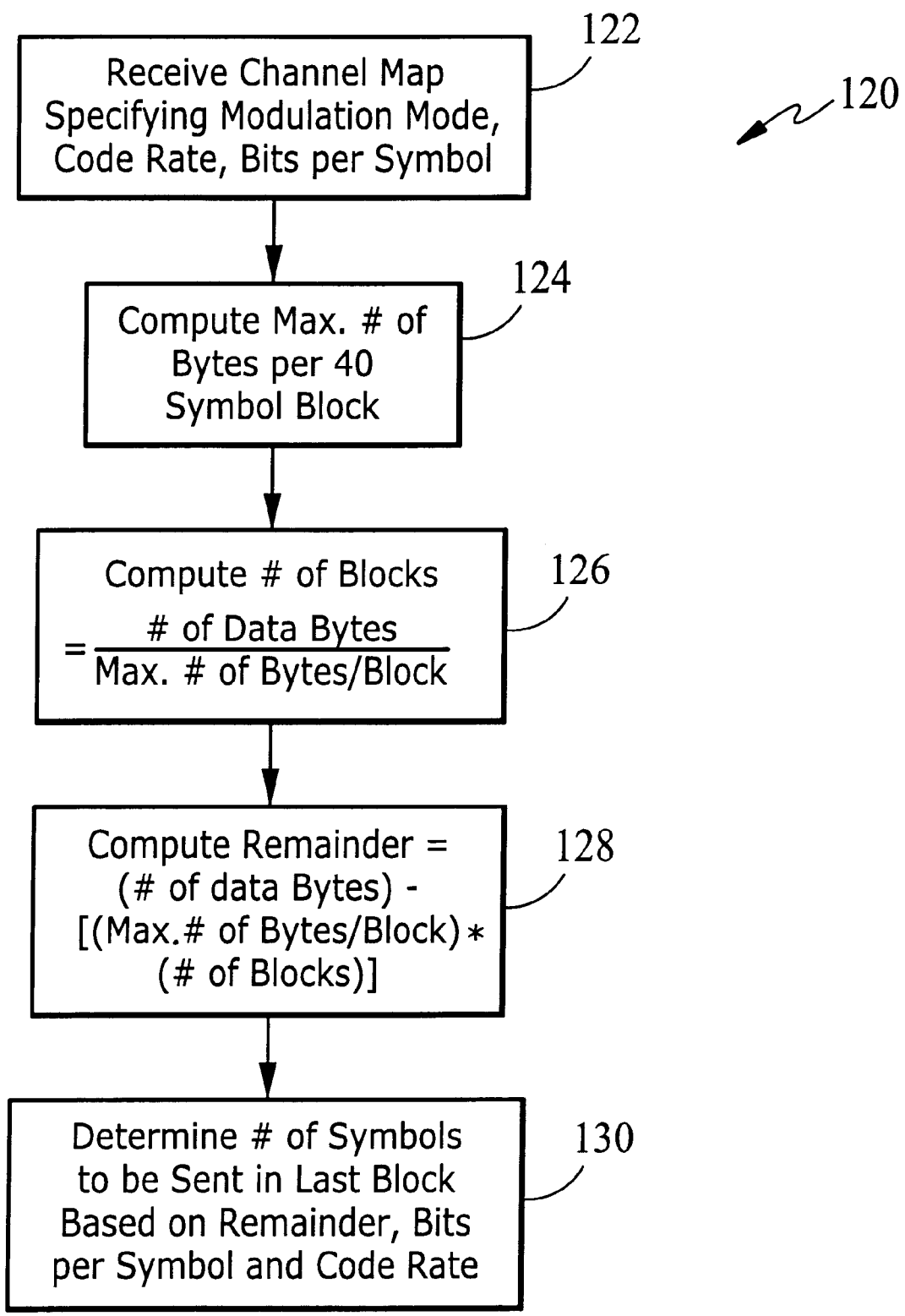
FIG. 5 is a flow diagram of the transmit (Tx) variable length OFDM symbol block computation for interleaver configuration as performed by the Tx configuration unit of FIG. 2.

Referring to FIG. 5, a process of computing a variable block length (for a variable size block) 120 as performed by the Tx configuration unit 52 is shown. The unit 52 receives the channel information (with mode, code rate and usable carriers) in the form of a channel map (step 122). From the channel information, the unit computes a maximum number of bytes per 40-symbol block (step 124). Once the maximum number of bytes has been determined, the unit 52 determines the total number of fixed-size (i.e., 40 symbols) blocks associated with the data transmission by dividing the total number of data bytes to be transmitted by the computed maximum number of bytes (per block) and rounding off the resulting quotient to the next lowest whole number (step 126). The remaining number of bytes is thus computed by subtracting the product of the maximum number of bytes per block and the number of blocks from the total number of data bytes (to be transmitted) (step 128). The unit 52 then computes the number of symbols to be included in the last, variable size block for the remaining number of bytes (step 130).

Figure 6:
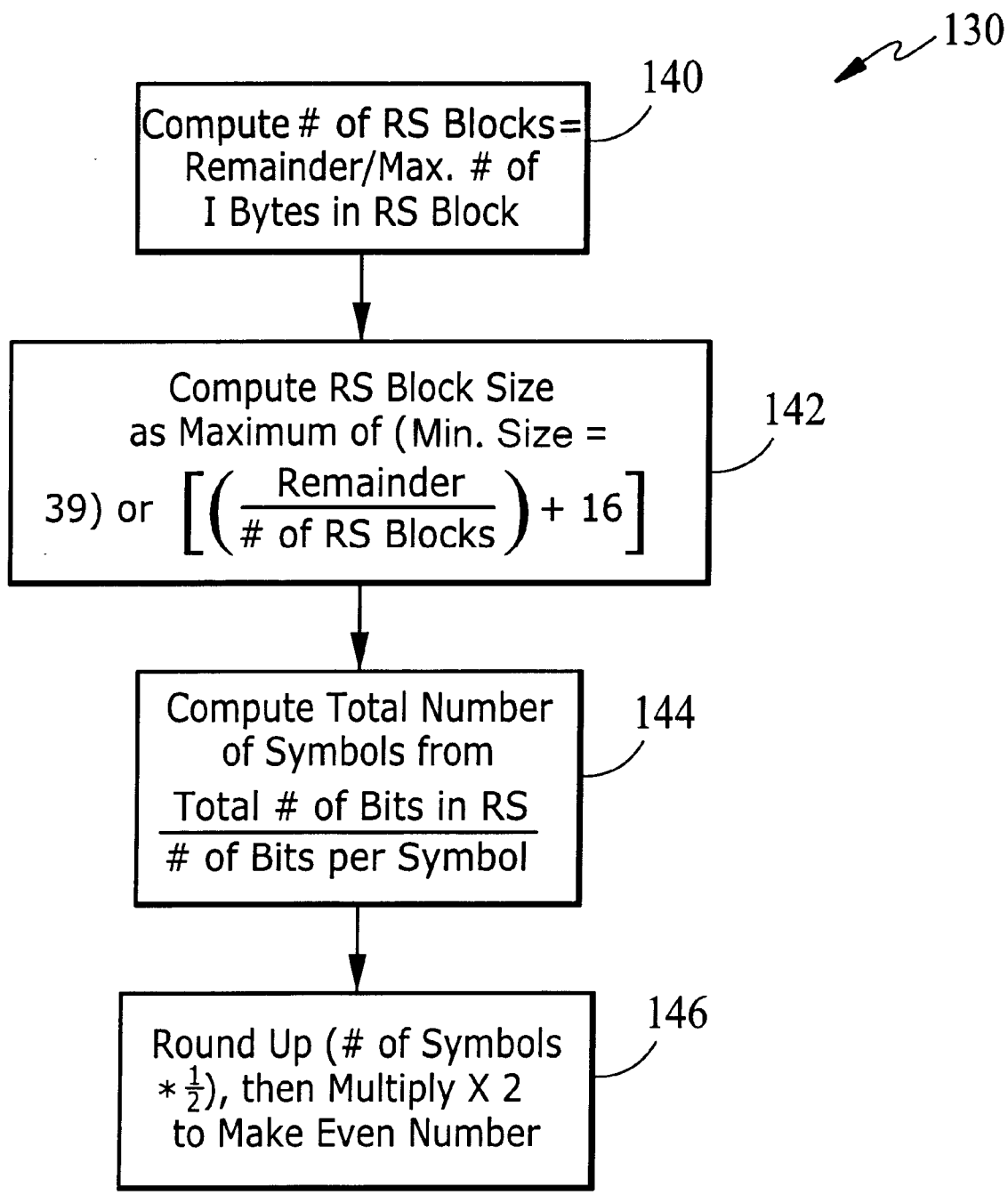
FIG. 6 is a flow diagram of the process of determining the number of symbols to send in a last, variable size OFDM symbol.

Referring to FIG. 6, the symbols number computation 130 is shown. First, the remainder is divided by the known maximum number of information bytes in an RS block (i.e., 239) to give a number of RS blocks (step 140). A block size for the RS block (including 16 bytes of parity) is then computed as the larger of two values, the minimum RS block size of 39 bytes or (the remainder divided the number of RS blocks) plus 16 (step 142). The total number of symbols upon which bits to be modulated on symbols after coding can then be determined by dividing a total number of bits in the RS block (that is, [the RS block size*number of RS blocks*8]+6) by the total number of bits per symbol (the number of usable carriers times the code rate) to give the number of symbols (step 144). As the number of OFDM symbols must be an even number due to the interleaver implementation, the result is converted to an even number as follows: the result is multiplied by ½ and rounded up to the next whole number, which is multiplied by 2 to produce an even number of symbols (step 146).

Once the number of symbols in the variable size last block is known, the Tx configuration unit 52 provides the computed number of symbols and the number of bits per symbol (based on the number of usable carriers, the modulation type and code rate), collectively referred to as interleaver configuration information, to the controller 76. The controller 76 uses the interleaver configuration information to configure the interleaver 84 for a number of columns based on the number of symbols and for a number of rows based on the number of bits per symbol.

Figure 7:
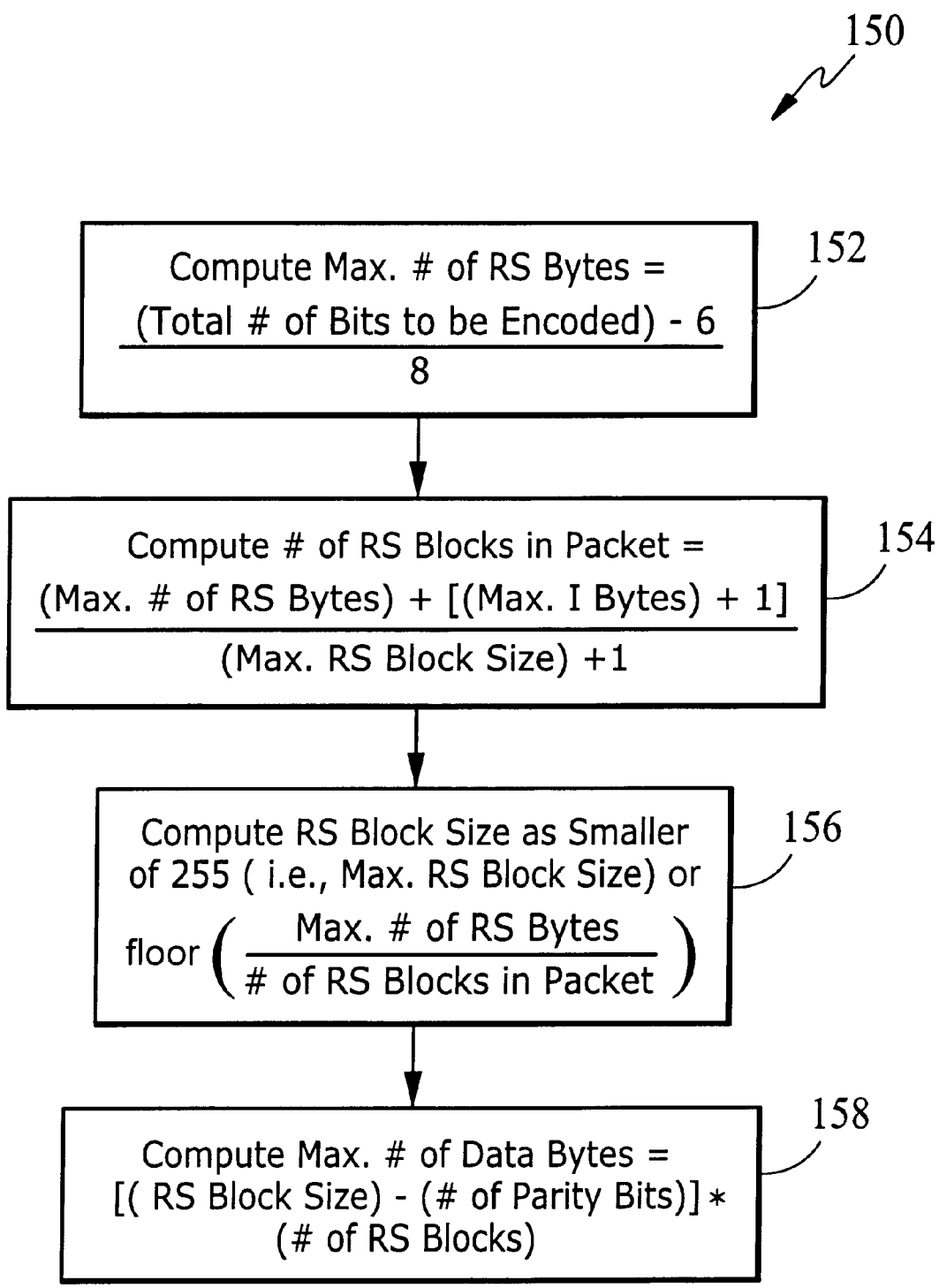
FIG. 7 is a flow diagram of the transmit (Tx) variable length OFDM symbol block computation for Reed-Solomon block size modification as performed by the Tx configuration unit of FIG. 2.

Referring to FIG. 7, the Tx configuration unit 52 also produces RS encoding configuration information 150 so that the RS block size can be modified for variable block length. The unit 52 subtracts 6 bits from the total number of bits to be encoded (i.e., the number of symbols times the number of bits per symbol times the code rate), divides that value by 8 and rounds down the resulting bytes value to the next lowest whole number to give the maximum number of RS bytes to be put on symbols of the last packet (step 152). The unit then computes the number of RS blocks in the block by dividing the sum of the maximum number of RS bytes and the maximum number of information bytes plus one by the maximum RS block size plus 1 and rounds down (step 154). The RS block size is computed as the smaller of 255 (i.e., the maximum RS block size) or rounded down quotient of the maximum number of RS bytes divided by the number of RS blocks (step 156). The unit uses these values to compute the maximum number of data bytes as the product of the RS block size minus the parity and the number of RS blocks (step 158).

It should be noted that, to compute the maximum number of RS bytes for robust mode blocks, the unit uses a predetermined number, e.g., 10 (as indicated above) or 5, defined for the robust transmission mode, as the number of symbols, a BPSK code rate of ½ and a number of bits per symbol equal to the number of usable carriers. The maximum number of data bytes is computed by subtracting eight from the maximum number of RS bytes.

Returning to FIG. 1, the demodulator 66 demodulates the modulated carriers using a scheme appropriate to the modulation technique used by the modulator 36. The demodulator 66 produces from a phase angle for each bit of the transmitted carrier data a 3-bit soft decision ("bit metric") value from 0 to 7 that represents a probability of a "0" or a "1" bit, with 7 representing a "1" and 0 representing a "0". A phase difference is determined using the following equation:

$$D_o = mod((2\Pi + \theta_k) - \Psi_k, 2\Pi) + tm \quad (2)$$

where $D_o$ is the $k_{th}$ carrier phase difference, $\theta_k$ is the current symbol's $k_{th}$ carrier phase, $\Psi_k$ is the previous symbol's $k_{th}$ carrier phase and 2Π radians is the maximum phase value. The phase difference $D_o$ is converted to a value of 0–127 points (2Π=128) $D_o$ is then offset by an amount, depending on the modulation type, to allow for a single soft decision conversion.

The de-interleaver 86 (of FIG. 2) receives the 3-bit soft decision value for each data bit. All 3-bit soft decision values are de-interleaved (i.e., stored in the de-interleaver) as a group. The method for writing the interleaver 84 applies to reading the de-interleaver 86 and the method of reading the interleaver 84 applies to writing the de-interleaver 86. The write operation uses the reverse algorithm of that applied to the interleaver during a read operation.

Figure 8:
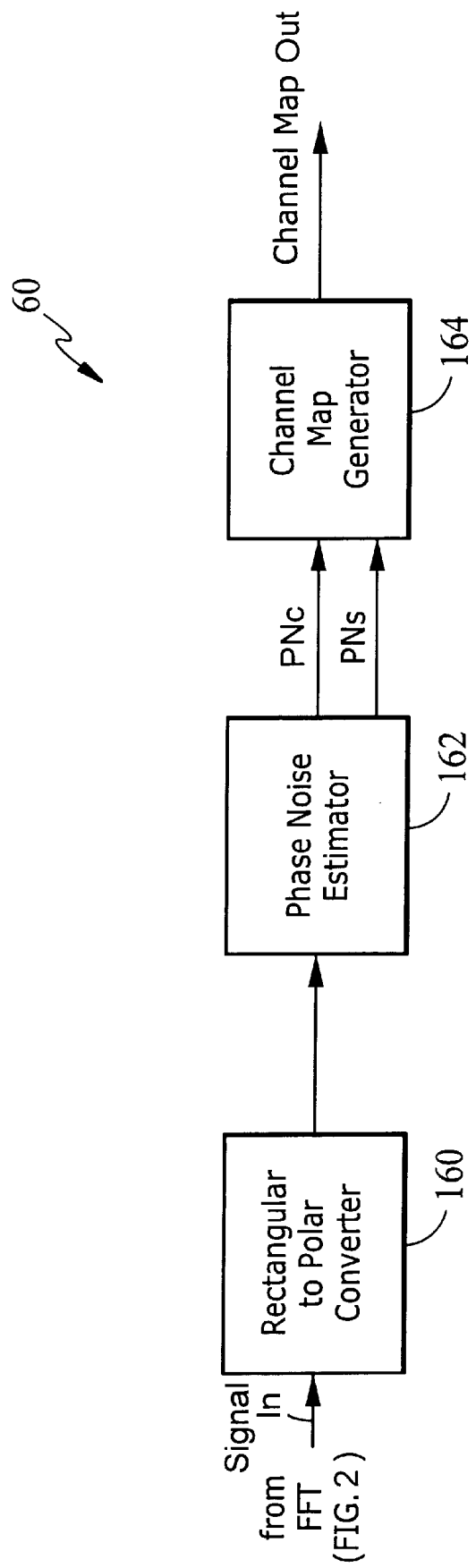
FIG. 8 is a block diagram of a channel estimation unit (shown in FIG. 2), the channel estimation unit including a phase noise estimator for performing average phase noise computation for carriers and symbols in a received OFDM symbol block and a channel map generator.

Referring to FIG. 8, the channel estimation unit 60 includes a rectangular to polar converter 160, a controller 162, referred to herein as a phase noise estimator 162, and a channel map generator 164. The rectangular to polar converter 62 receives complex numbers from the FFT unit 58 and converts the complex numbers to polar to give a corresponding phase angle sample. The output of the converter 160 is provided to the phase noise estimator 162, which produces average carrier phase noise values $PN_c$ and symbol phase noise values $PN_s$, in the manner described in above-referenced application. The phase noise estimator 62 monitors the phases and amplitudes of each carrier in each OFDM symbol as they are received from the FFT unit 58. The phase noise estimator 162 computes the phase noise associated with each carrier and each symbol by performing phase noise estimation, phase noise estimation accumulation and averaging. The phase noise estimation can be performed for either BPSK or QPSK, that is, whichever modulator type was used by the modulator. For BPSK, a binary 1 causes the transmission of a zero phase and binary 0 the transmission of a Π phase. Thus, in the case of BPSK, which sends only the two states (corresponding to "1" and "0"), the phase noise estimator measures how far the samples are from the expected 1 and 0 values.

The constellation plot for the sample may be represented in binary form, with 0 to 2Π radians being represented as 0 to 127 (or 0 to 255) points. For a given sample X, the phase noise computation estimator 162 computes a phase noise estimation for the carrier frequency of that sample. It then computes an average of the computed phase noise values for each carrier frequency as well as each symbol. The average may be expressed as $$PN_{avg} = (\Sigma Y1)/(total\ number\ of\ samples) \quad (3)$$

where $Y1 = |Y-(\Pi/2)|$ and $Y = mod[X+(\Pi/2);\Pi]$. The value Y1 is the phase noise and is expressed in terms of number of points from the ideal expected modulation values, which in the case of BPSK are zero or Π, the zero or Π states being indicative of no noise.

The phase angle is represented in binary form as a phase number between 0 and 127 (or 0 and 255). The phase noise computation estimator 162 creates a modulus of a phase number y, e.g. 64 (or 32), adds y/2 points, and finds X+(y/2) mod y. It then subtracts y/2 so that the result is always a value between −y/2 and +y/2. Once the phase noise estimator 162 obtains the absolute value of that value, the result lies in the first quadrant (0 to y/2) of the constellation.

Figure 9A:
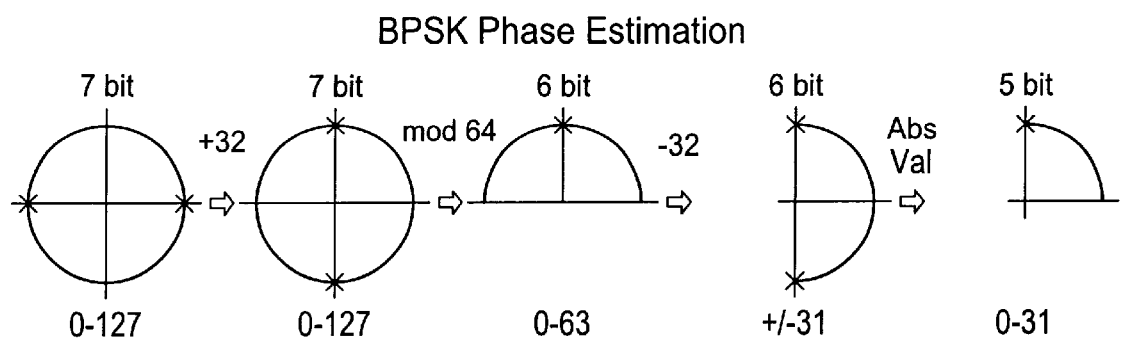
FIGS. 9A and 9B is an illustration of phase noise computation for BPSK modulation and QPSK modulation, respectively.

An exemplary phase noise calculation for BPSK is illustrated in FIG. 9A. In the constellation plot of the example shown, 2Π radians is represented as a binary value corresponding to 128 points. For a sample having a phase number of 80, the calculation adds 32 to give a sum of 112 and computes (112 mod 64). Thus, referring to Eq. (3), Y equals 48 and Y1 is equal to the absolute value of (48−32), or 16 points.

Figure 9B:
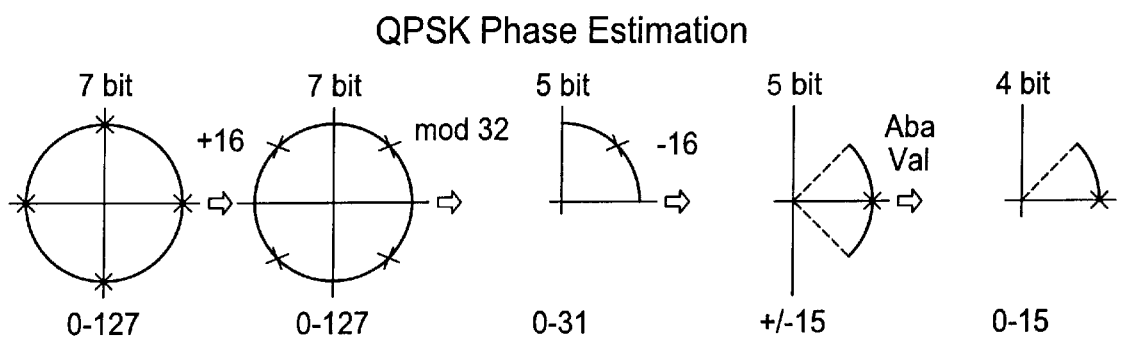

A similar phase noise computation may be performed for QPSK, which uses four states (or phases) spaced Π/2 apart. An exemplary QPSK phase noise estimation is illustrated in FIG. 9B.

The phase noise average of Eq. (3) may be computed for phase noise as a function of the carrier, the symbol, or both. To compute the carrier phase noise average, $PN_c$, the phase noise estimator accumulates carrier values for a given carrier for all of the symbols and divides by the total number of symbols. In the described embodiment, the total number of symbols in an OFDM packet is 40. Thus, $PN_c$ is the average phase noise for a carrier for an entire block of data. Additionally, for a symbol phase noise average, $PN_s$, the phase noise across all carriers in a symbol is accumulated and divided by total number of carriers (i.e., 84). The $PN_s$ value provides an indication of how carrier phase noise varies (relative to $PN_c$) from symbol to symbol.

Thus, the combination provides a reasonable estimate of signal-to-noise (S/N) for a given carrier on a symbol-by-symbol basis.

Figure 10:
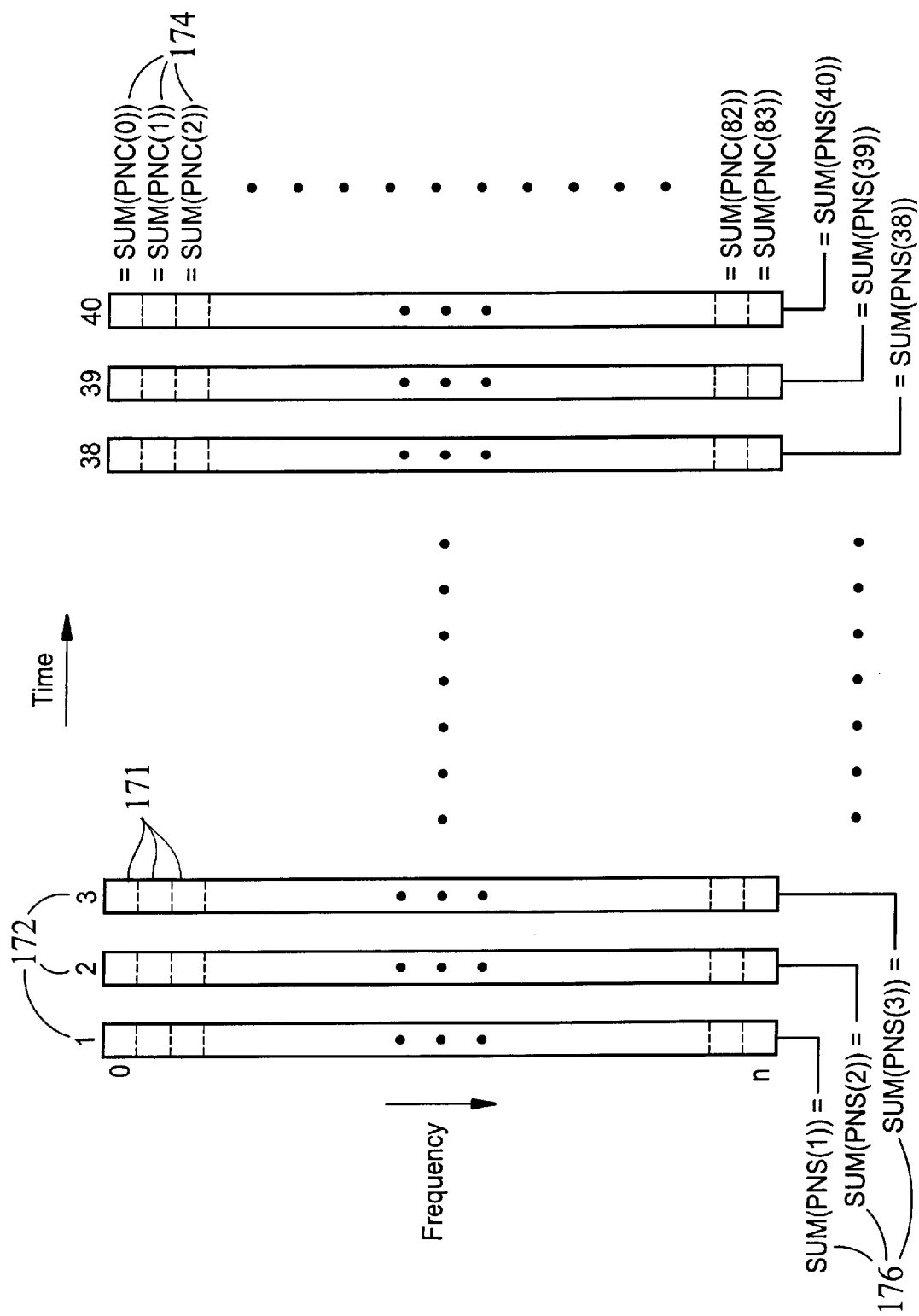
FIG. 10 is an illustration of the accumulation portion of phase noise averaging performed across both carriers and symbols.

Referring to FIG. 10, the accumulation (or summation) of phase noise values for a given carrier frequency over time and by symbol 170 is depicted. The phase noise values for each carrier 171 are accumulated by summing the phase noise values for each carrier over the forty OFDM symbols 172 to give a sum, SUM(PNC(M)) 174, where M is one of the usable carriers. Similarly, the phase noise values are accumulated for each OFDM symbol 172 by summing the phase noise values for all usable carriers 171 to give a sum, SUM(PNS(N)) 176, where N is one of symbols 1 through 40. The total number of symbol accumulations or sums is therefore 40. Any carriers not used by the transmission are excluded from the summation.

As discussed in the above-referenced co-pending application, the phase estimator/controller 162 uses above described phase noise computation to weight the four robust transmission mode copies differently (i.e., the copy samples with less phase noise are weighted more heavily than the copy samples with more phase noise) and recombines the weighted copies prior to decoding.

Referring back to FIG. 8, the channel map generator 164 receives the PN, and PNC values and uses those values to select a modulation type/code rate and associated "good carriers" based on the channel conditions as reflected in the average phase noise values. The selected mode/rate and associated carriers, once obtained, are defined in a channel map, which is stored in the channel map memory 78 (of FIG. 2) and also sent to the MAC (via the PHY-to-MAC interface 74) for transfer to the transmitting network node. Once stored in the channel map memory 78, the channel map is available to and can be accessed by the Rx configuration unit 72 (FIG. 2) for decoding during the next data transmission over the channel to which the channel map corresponds.

The channel map generator 164 uses six types of thresholds to assess the conditions of the channel. Included are two symbol thresholds, a first symbol threshold THDS1 and a second symbol threshold THDS2. Also included among the five threshold types are three carrier thresholds, THDM1, THDM2 and THDM3, corresponding to modulation types BPSK with ½ rate error coding ("½ BPSK"), QPSK with ½ rate error coding ("½ QPSK") and QPSK with ¾ rate error coding ("¾ QPSK"), respectively. Also employed is a jammer detection threshold for detecting jammer signals on a carrier by carrier basis. Therefore, these six thresholds, in conjunction with the average phase noise values (for symbols and/or carriers) and carrier amplitudes, are used to generate information (for each modulation type) indicative of noise events that occurred in the data packet.

Figure 11:
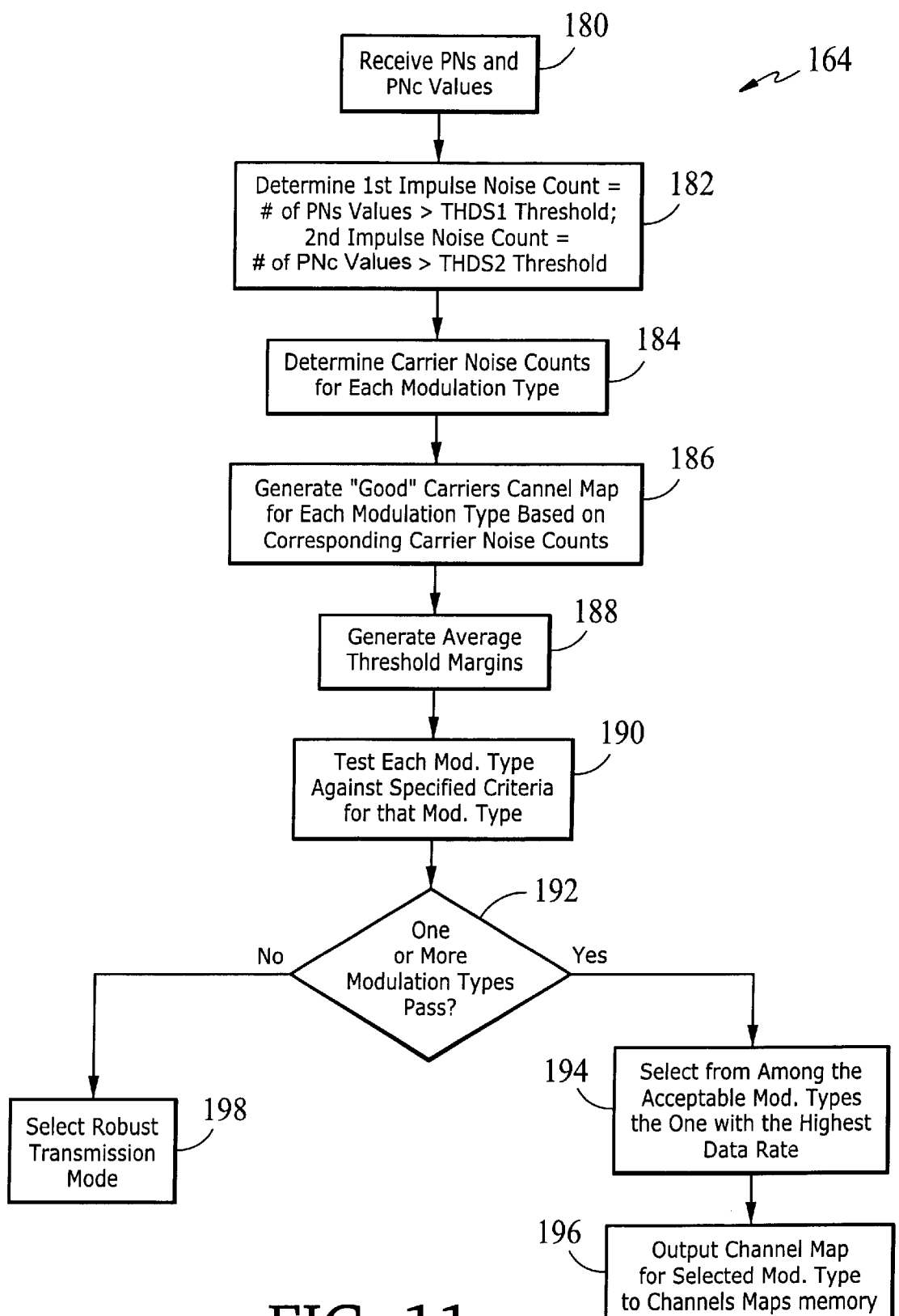
FIG. 11 is a flow diagram of a channel map generation process which uses the phase noise to identify good carriers associated with BPSK and QPSK, and to select a modulation type.

Referring to FIG. 11, the channel map generation process 164 is shown. The process receives from the phase noise estimator 162 the $PN_s$ and $PN_c$ values for a block of data being demodulated and decoded (step 180). The process then determines a first impulse noise count $PN_{c1}$, the total sum (or count) of $PN_s$ values exceeding THDS1, and a second impulse noise count $PNS_{c2}$, the total sum (or count) of $PN_s$ values exceeding THDS2 (step 182). The $PNS_{c1}$ and $PNS_{c2}$ values provide an indication of impulse noise at the levels corresponding to THDS1 and THDS2, respectively. That is, the counts provide an indication of the amount of impulse noise on the channel or, more specifically, how often a noise event of sufficient magnitude causes a particular symbol's noise level to exceed one or both of the thresholds THDS1 and THDS2. Preferably, the thresholds THDS1 and THDS2 are adjusted dynamically on a block-by-block basis using an average of the $PN_s$ values for each block. Thus, for a block having an average $PN_s$ of some value X, TDS1 may be set to a first threshold value X+y1 and THDS2 set to a second threshold value X+y2, where y1 and y2 are constants and y1<y2 so that THDS1 and THDS2 correspond to respective different levels of impulse noise.

Still referring to FIG. 11, the process finds the total number (or count) of carriers for which the $PN_c$ values which are below each of the carrier thresholds THDM1, THDM2 and THDM3, as well as the jammer detection threshold (step 184). It computes a first count, $BPSK_c$, as the number of carriers having a $PN_c$ value less than the ½ BPSK threshold, THDM1, and an amplitude less than the jammer detection threshold. It computes a second count, $QPSK_{c1}$, as the number or count of carriers whose $PN_c$ value is less than the ½ QPSK threshold, THDM2, and whose amplitude is less than the jammer detection threshold. A third count, $QPSK_{c2}$, corresponding to the number or count of carriers having a $PN_c$ value that is less than the ¾ QPSK threshold, THDM3, as well as an amplitude below the jammer detection threshold, is also computed.

Therefore, an accumulator counts the number of times the average phase noise is better than the threshold level. That is, the $PN_s$ is compared to THDS1 and THDS2, and $PN_c$ is compared to THDM1, THDM2 and THDM3 thresholds. The $PN_c$ counts are incremented only when the phase noise average is below the threshold and the amplitude value is below a jammer detect threshold for the same carrier.

As the $PN_c$ for each of the carriers is compared to each of the three carrier thresholds, the generator produces an 84-bit "good carriers" channel map for each of the three modulation types 186. More specifically, for each of the 84 carriers (carriers 0–83), a bit is set in the channel map if the $PN_c$ is below the threshold and the amplitude value is below the jammer detect threshold.

Additionally, the process computes average threshold margins MAR1, MAR2 and MAR3 for the good carriers represented by each of the carrier counts $BPSK_c$, $QPSK_{c1}$ and $QPSK_{c2}$, respectively (step 188). During each carrier threshold comparison for each modulation type, if the carrier threshold noise requirement is exceeded (that is, $PN_c$ is less than the threshold), the amount by which it is exceeded is accumulated. After all of the threshold comparisons for a given threshold have been performed, the accumulated number is divided by the number of times the threshold requirement was exceeded to give an average margin (i.e., amount below the threshold).

As the carrier phase noise averages $PN_c$ are compared to the three thresholds and channel maps are generated, the process performs a test for each of the modulation types associated with the standard transmission to determine if certain criteria have been met for the good carriers indicated by their corresponding channel maps (step 190). The criteria for each modulation type is provided in Table 1 below.

TABLE 1

| Modulation Type | Criteria (*)<br>(*) For each modulation type,<br>THDS1 = 13.0 (0 dB SNR) and THDS2 = 9.0 (4.5 dB SNR)) |
|---|---|
| ½ BPSK | For THDM1 = 10.4<br>a) CNTM1 >42 (greater than 42 good carriers, requires 3 dB SNR)<br>b) MAR1 >1.5 (margin >1.5 dB)<br>c) CNTS1 <8 (less than 8 corrupted symbols) |
| ½ QPSK | For THDM2 = 7.3<br>a) CNTM2 >21 (greater than 21 good carriers, requires 6 dB SNR)<br>b) MAR2 >1.5 (margin >1.5 dB)<br>c) CNTS2 >6 (less than 6 corrupted symbols) |
| ¾ QPSK | a) CNTM3 >21 (greater than 21 good carriers, requires 9 dB SNR)<br>b) MAR3 >1.5 (margin 1.5–2 dB)<br>c) CNTS2 = 0 (no impulse noise)<br>d) Average PQ <8 (5 dB SNR) |

The process thus determines if any one or more of the modulation types associated with the standard transmission mode meet the specified criteria (step 192). If the process determines that one or more of the modulation types associated with standard transmission mode meets the specified criteria, for each modulation type that meets the specified criteria (as shown in Table 1), the process computes the relative data rate based on the number of carriers (specified by the appropriate one of CNTM1, CNTM2, or CNTM3) and selects the modulation type with the highest data rate (step 194); however, the highest modulation rate must be faster than the next highest modulation rate by some predetermined amount (e.g., 10%) faster to be selected. Otherwise, the process selects the next highest modulation rate. The "good carriers" channel map for the selected modulation type (and coding rate) is then stored in the channel maps memory (step 196). Using BPSK as an example, with 1 bit per carrier and a CNTM1=50 at a ½ rate error coding, the data rate is equal to ½*(50 bits/symbol time) or 25 bits/symbol time. Therefore, the relative data rate is 25. With ½ QPSK having the same count and 2 bits per carrier, the relative data rate is ½*(100)=50. For ¾ rate QPSK with CNTM3=50, the relative date rate is ¾(100)=75. In this example, then, based on the relative dates of 25, 50 and 75 for ½ BPSK, ½ QPSK and ¾ QPSK, respectively, the process selects ¾ QPSK. If the criteria is not satisfied for any of the three modulation types (at step 192), then the channel is too noisy to for the transmission rates of the standard transmission mode and the more reliable robust transmission mode is selected (step 198).

Once stored in the channel maps memory 78, the channel map is available to the Rx configuration unit 72 as well as the controller 76, which directs a copy to the PHY-to-MAC interface for transfer to the transmitting network node. The transmitting network node stores the channel map in its own channel maps memory 78 for subsequent use by its Tx configuration unit 52 when preparing a next data transmission to the receiving network node over the channel to which the map corresponds. Alternatively, if the robust transmission mode is selected, the selection of the robust transmission mode is conveyed to the transmitting network node.

Other Embodiments

It is to be understood that while the invention has been described in conjunction with the detailed description thereof, the foregoing description is intended to illustrate and not limit the scope of the invention, which is defined by the scope of the appended claims. Other embodiments are within the scope of the following claims.

For example, the channel estimation unit could select modulation mode/coding rates on a carrier by carrier basis. This "bit loading" technique would allow a different amount of modulation to be put on each carrier based on the signal-to-noise ratios. Although the above processes are described with respect to ½ and ¾ coding rates, other coding rates (e.g., ⅞) may be used. Also, other FEC coding and interleaving schemes may be used.

Alternatively, or in addition to the above, channel adaption may involve varying symbol time guard intervals to change the data rate. For example, the channel estimation unit may use the output of the phase correlator described in co-pending application Ser. No. 09/234,289, in the name of Lawrence W. Yonge III, incorporated herein by reference, to determine delay spread in the channel and detect jammers. Based on this delay spread determination and jammer detection, the channel estimation unit can select a guard interval to adjust the date rate.

In addition, the noise estimation associated with the carriers over time may be based on amplitude instead of phase, as described above.

What is claimed is:

1. A method of adapting a forward error correction (FEC) encoder to a channel over which data encoded by the FEC encoder and modulated onto OFDM symbols is to be transmitted in a data transmission to a receiving network node, comprising:

receiving channel information for specifying symbol block sizes associated with the data transmission, the received channel information being based on a prior data transmission to the receiving network node, the received channel information being based on characteristics of the channel and including a modulation type and carriers capable of supporting the modulation type for the channel;

computing FEC encoder configuration information based on the received channel information;

configuring the FEC encoder to operate on the data according to the configuration information; and wherein the symbol block sizes include a fixed size and a variable size and wherein computing FEC encoder configuration values comprises:

determining from the channel information a number of symbol blocks of the fixed size and a number of remaining data bytes to be included in a last symbol block of the variable size; and computing a number of symbols for transmitting the remaining data bytes from the number of remaining data bytes, the channel information and a code block size associated with the FEC encoder.

2. The method of claim 1, wherein the FEC encoder includes an interleaver and configuring comprises:

configuring the interleaver to store the last variable size symbol block of encoded data based on the computed number of symbols and the channel information.

3. The method of claim 2, wherein computing the number of symbols comprises:

computing a number of Reed-Solomon blocks based on the computed remaining number of bytes and a maximum number of information bytes in a Reed-Solomon block of data;

computing a Reed-Solomon block size based on the remaining number of bytes and the number of Reed-Solomon blocks; and computing the total number of bits to be modulated on the symbols after coding from the computed number of Reed-Solomon blocks and block size.

4. The method of claim 3, wherein the FEC encoder includes a Reed-Solomon encoder and computing further comprises:

computing a maximum number of Reed-Solomon bytes in the last variable size symbol block; and computing a Reed-Solomon block size based on the maximum number of Reed-Solomon bytes in the last variable size block.

5. The method of claim 4, wherein the FEC encoder includes a convolutional encoder and wherein computing the maximum number of Reed-Solomon bytes comprises:

computing a total number of bits to be encoded from the channel information;

subtracting a number of tail bits employed by the convolutional encoder from the total number of bits to be encoded to produce a difference value; and dividing the difference value by eight.

6. The method of claim 4, wherein computing the Reed-Solomon block size comprises:

using the maximum number of Reed-Solomon bytes to compute a number of Reed-Solomon blocks in the last variable size symbol block;

finding a quotient value equal to the maximum number of Reed-Solomon bytes divided by the number of Reed-Solomon blocks in the last variable size symbol block;

rounding off the quotient value to the next lowest whole number as a new quotient value; and choosing the smaller of the new quotient value and the a maximum block size associated with the Reed-Solomon encoder.

7. The method of claim 4, wherein configuring configures the Reed-Solomon encoder to operate according to the computed number of RS blocks and the RS block size.

8. A computer program residing on a computer-readable medium for adapting a forward error correction (FEC) encoder to a channel over which data encoded by the FEC encoder and modulated onto OFDM symbols is to be transmitted in a data transmission to a receiving network node, the computer program comprising instructions causing a computer to:

receive channel information for specifying symbol block sizes associated with the data transmission, the received channel information being based on a prior data transmission to the receiving network node and characteristics of the channel, the received channel information including a modulation type and carriers capable of supporting the modulation type for the channel, and the symbol block sizes including a fixed size and a variable size;

compute FEC encoder configuration information based on the received channel information by determining from the channel information a number of symbol blocks of the fixed size and a number of remaining data bytes to be included in a last symbol block of the variable size and computing a number of symbols for transmitting the remaining data bytes from the number of remaining data bytes, the channel information and a code block size associated with the FEC encoder; and configure the FEC encoder to operate on the data according to the configuration information.

9. The computer program of claim 8, wherein the FEC encoder includes an interleaver and the instructions for configuring comprise instructions causing the computer to:

configure the interleaver to store the last variable size symbol block of encoded data based on the computed number of symbols and the channel information.

10. The computer program of claim 9, wherein the instructions for computing the number of symbols comprise instructions causing the computer to:

compute a number of Reed-Solomon blocks based on the computed remaining number of bytes and a maximum number of information bytes in a Reed-Solomon block of data;

compute a Reed-Solomon block size based on the remaining number of bytes and the number of Reed-Solomon blocks; and compute the total number of bits to be modulated on the symbols after coding from the computed number of Reed-Solomon blocks and block size.

11. The computer program of claim 10, wherein the FEC encoder includes a Reed-Solomon encoder and the instructions for computing further comprise instructions causing the computer to:

compute a maximum number of Reed-Solomon bytes in the last variable size symbol block; and compute a Reed-Solomon block size based on the maximum number of Reed-Solomon bytes in the last variable size block.

12. The computer program of claim 11, wherein the FEC encoder includes a convolutional encoder and wherein the instructions for computing the maximum number of Reed-Solomon bytes comprise instructions causing the computer to:

compute a total number of bits to be encoded from the channel information;

subtract a number of tail bits employed by the convolutional encoder from the total number of bits to be encoded to produce a difference value; and divide the difference value by eight.

13. The computer program of claim 11, wherein the instructions for computing the Reed-Solomon block size comprise instructions causing the computer to:

use the maximum number of Reed-Solomon bytes to compute a number of Reed-Solomon blocks in the last variable size symbol block;

find a quotient value equal to the maximum number of Reed-Solomon bytes divided by the number of Reed-Solomon blocks in the last variable size symbol block;

round off the quotient value to the next lowest whole number as a new quotient value; and choose the smaller of the new quotient value and the a maximum block size associated with the Reed-Solomon encoder.

14. The computer program of claim 11, wherein the instructions for configuring further comprise instructions causing the computer to:

configure the Reed-Solomon encoder to operate according to the computed number of RS blocks and the RS block size.

\* \* \* \* \*

UNITED STATES PATENT AND TRADEMARK OFFICE
CERTIFICATE OF CORRECTION

PATENT NO. : 6,397,368 B1
DATED : May 28, 2002
INVENTOR(S) : Lawrence W. Yonge III, Bart W. Blanchard, Harper Brent Mashburn, Timothy Robert Gargrave and William Edward Lawton It is certified that error appears in the above-identified patent and that said Letters Patent is hereby corrected as shown below:

Drawings,
FIG. 11, at 186, "Cannel" should be -- Channel --.

Column 5,
Delete lines 51-65, starting with "In the preferred".

Column 6,
Line 43, "Its" should be -- It --.

Column 8,
Line 25, after "divided" insert -- by --.

Column 9,
Equation (2), delete "+tm".

Column 10,
Line 63, "PN" should be -- $PN_s$ -- and "PNC" should be -- $PN_c$ --.

Column 11,
Line 26, "$PN_{c1}$" should be -- $PNS_{c1}$ --.

Column 12,
Table 1, after "3/4 QPSK" insert -- For THDMC=5.0 --.
Table 1, last line at (d), "PQ" should be -- $PN_s$ --.

Column 13,
Line 6, delete "to".

Column 14,
Line 59, delete "a".

UNITED STATES PATENT AND TRADEMARK OFFICE
CERTIFICATE OF CORRECTION

PATENT NO. : 6,397,368 B1
DATED : May 28, 2002
INVENTOR(S) : Lawrence W. Yonge III, Bart W. Blanchard, Harper Brent Mashburn, Timothy Robert Gargrave and William Edward Lawton It is certified that error appears in the above-identified patent and that said Letters Patent is hereby corrected as shown below:

<u>Column 16,</u>
Line 34, delete "a".

Signed and Sealed this

Fourteenth Day of January, 2003

JAMES E. ROGAN
*Director of the United States Patent and Trademark Office*